F. E. PENDLETON.
STEAM TRAP.
APPLICATION FILED APR. 5, 1917.
1,280,828.
Patented Oct. 8, 1918.
2 SHEETS—SHEET 2.
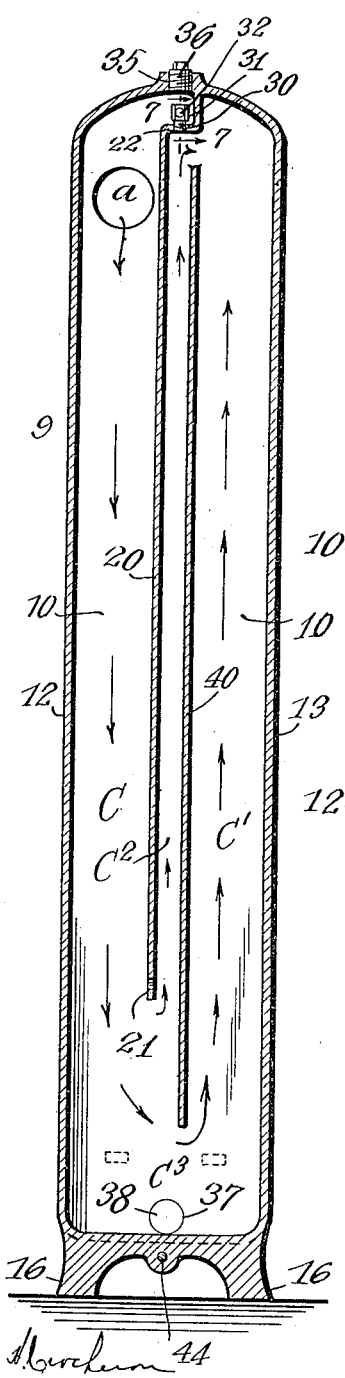
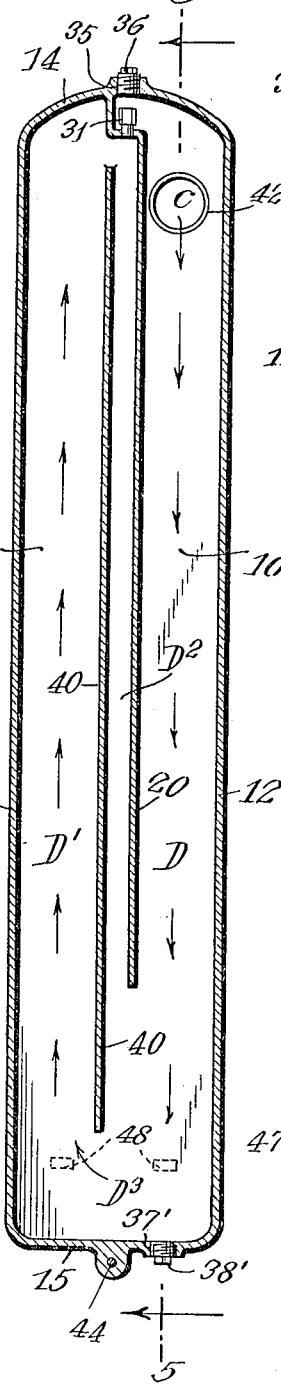
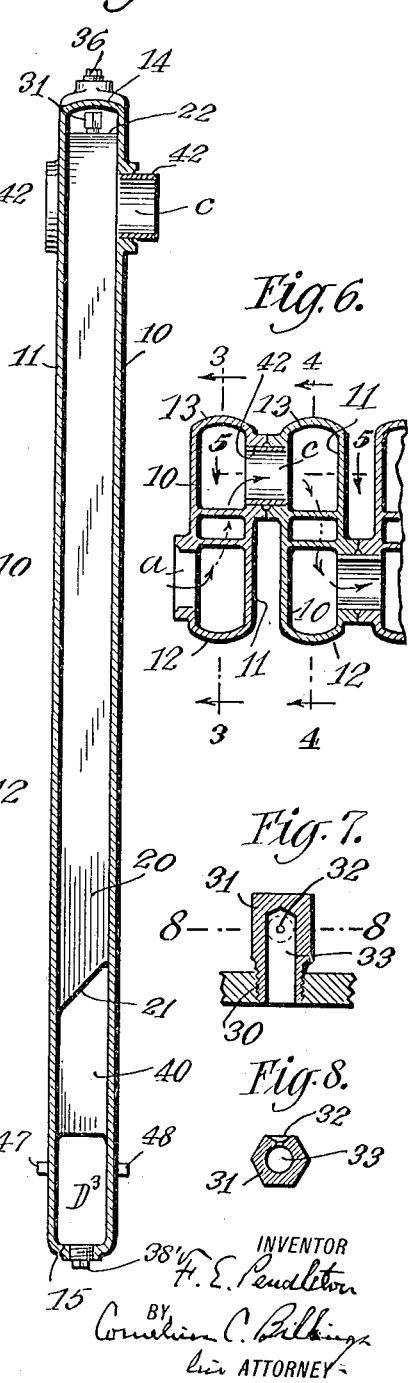
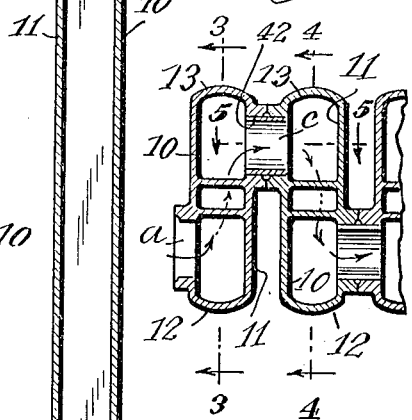
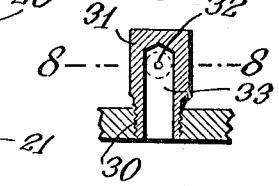
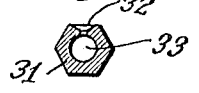

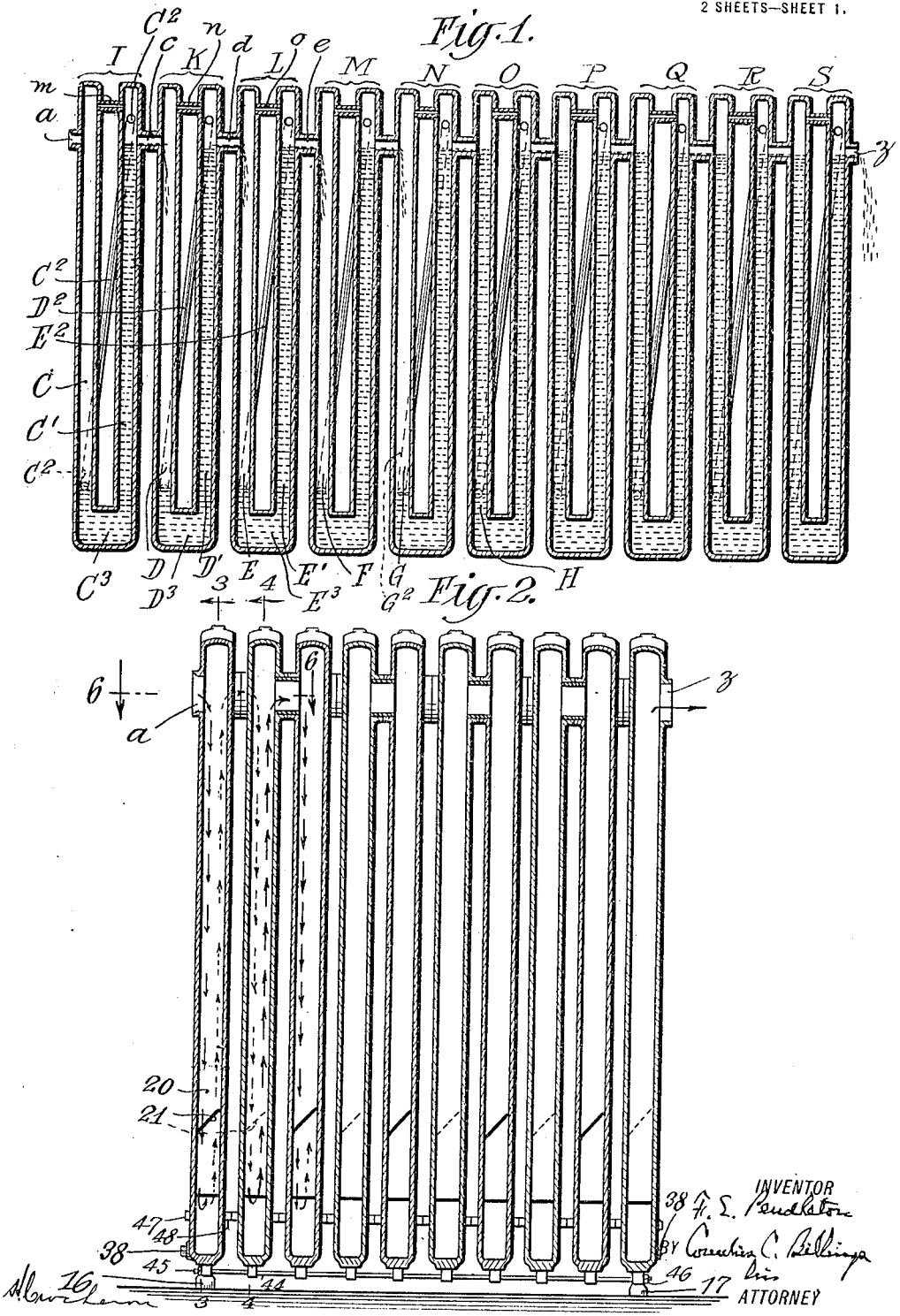

UNITED STATES PATENT OFFICE.

FRANK E. PENDLETON, OF MONTCLAIR, NEW JERSEY.

STEAM-TRAP.

1,280,828.  Specification of Letters Patent.  Patented Oct. 8, 1918.

Application filed April 5, 1917. Serial No. 159,904.

*To all whom it may concern:*

Be it known that I, FRANK E. PENDLETON, a citizen of the United States, and a resident of Montclair, county of Essex, and State of New Jersey, have invented certain new and useful Improvements in Steam-Traps, of which the following is a specification.

One of the objects of my invention is to provide a device without moving parts for automatically removing water from steam flowing through a pipe leading from a vessel containing water and steam, such as a boiler, without allowing any of the steam to escape. Although this invention is primarily intended to be used as a steam trap for the purpose stated, yet it may also be used with any type of vessel or receptacle wherein is contained a liquid and a superimposed vapor for the purpose of removing the liquid without permitting the escape of any of the vapor, such as the removal of water from a pipe or other receptacle containing compressed air, or for the removal of oil from a pipe or receptacle containing steam, air, or other vapor.

The invention therefore, is not to be construed as being limited in its application to the mere removal of water from steam.

In the usual form of steam traps heretofore constructed, a chamber is provided within the trap wherein water may collect and in the wall of such chamber is ordinarily provided an opening normally closed by a valve, but which from time to time is opened to allow water to be discharged from the trap through said opening. The valve is operated in certain types of traps by what is known as a bucket float, in others by some form of air tight float which rises and falls with the change of the level of the water within the trap, and in others by the expansion and contraction of a metal part of the trap due to changes in the temperature of said part.

The first mentioned type of trap permits the water to accumulate within the trap and bucket until the buoyancy of the bucket float has been over-balanced, causing the float to sink, thereby opening the valve and discharging from the trap a quantity of water equal in amount to all accumulations received by the trap since the previous operation of the valve. In the second type the float immediately operates, when the accumulated water raises the float, to open the valve, thereby maintaining within the trap at all times the same amount of water.

In the third type of trap, an accumulation of water over, around or in an expansion member, upon cooling, allows the expansion member to contract and thereby cause the opening of a valve, thus releasing the water surrounding or in the expansion member which is replaced by relatively hot steam which acts upon the expansion member to again close the valve.

In all of these types of steam traps, a valve and accompanying valve seat are essential parts of the device and the efficiency and proper operation of the device is dependent upon a proper opening of the valve when water is to be discharged, and a proper and tight closure of the valve when there is no water to be discharged, to prevent the escape of steam from the chamber. There is, however, much trouble experienced in the operation of such traps, such as flooding the trap, due to the sticking of the valve resulting from the accumulations of scale upon or around the moving parts, thus causing the valve to remain closed when it should be open. Trouble is also experienced because of incomplete closure of the valve resulting from scale or foreign matter getting between the valve and its seat to prevent tight closure, and thus allow not only water, but also steam to escape. Again, the constant flow of water through the valve opening and between the valve and seat causes a cutting or erosion of one or both parts, resulting in an imperfect valve and imperfect closure of the valve, thus allowing steam as well as water to escape.

Further, as the operating force available for opening and closing the valve is in most forms of trap only the relatively small force due to the buoyancy of a float or similar device, the size of the valve operated thereby and the size of the opening which it normally covers must be relatively small to secure positive operation, and if the pressure of the vapor superimposed above the water in the trap or in the vessel to which the trap is connected is but slightly greater than the pressure at the outlet or discharge of the trap, the rate of discharge of the water is consequently low and is less than is often required and the water is not drained away through the trap with sufficient rapidity.

Having referred to the essential elements and certain of the defects occurring in the usual form of traps previously in use, one of the objects of my invention is to produce a trap without any working or moving parts, thus entirely eliminating wear and expense of maintenance;

Another object, is, to produce a trap that will allow a free escape of liquid but will prevent the escape of any of the superimposed vapor at any pressure up to the maximum allowable with a given design of trap, and yet without the use of any valve whatever, thus entirely eliminating the trouble and expense caused by the sticking of the valve and consequent flooding of the trap, which defects require repairs or cleaning with consequent interruption to continued use of the trap.

Another object is to construct a trap which will entirely eliminate the loss of steam due to cutting or leaking of valves.

Another object is to produce a trap that will furnish a channel for the discharge of water that may be as large as the area of the pipe to which the trap is connected, or larger to any extent that may be desired, thus permitting the discharge of a maximum amount of water even with relatively low pressure of the superimposed vapor.

Other objects will appear from the subjoined specification and claims.

Referring to the drawings in which the same reference characters indicate the same part in the several views;

Figure 1 is a conventional arrangement of chambers, pipes and fittings with contained water or other liquid which illustrates in section all of the elements of the device.

Fig. 2 is a vertical section of a practical embodiment of my invention showing a series of chambers or casings connected together in proper fashion, and which in form, as well as in manner of connection of each section to the adjoining section, are similar in outward design and structure to a form of steam radiator in common use.

Fig. 3 is a vertical section taken on line 3—3 of Figs. 2 and 6.

Fig. 4 is a vertical section taken on line 4—4 of Figs. 2 and 6.

Fig. 5 is a vertical section taken on line 5—5 of Fig. 4.

Fig. 6 is a horizontal section taken on line 6—6 of Fig. 2.

Fig. 7 is a detail showing a vertical section on line 7—7 of Fig. 3.

Fig. 8 is a horizontal section taken on line 8—8 of Fig. 7.

In describing the structure and operation of my invention, it is only necessary to refer to a minimum number of sections or uprights containing the chambers for the reception of the water or other liquid, though it is obvious that as many contiguous sections of like construction may be used as desired.

Therefore, in the interest of clearness and brevity, this plan will in the main be followed in describing the apparatus embodying my invention.

Referring to the drawings, the theory upon which my invention is based, and also its operation, will be better understood from a consideration of the conventional showing in Fig. 1 in which I have illustrated a plurality of pairs I, K, L, M, N, O, etc., of vertically extending chambers, each pair or section comprising a receiving and a discharge chamber such as the chambers C and C' in section I, D and D' in section K, E and E' in section L, and so on, said chambers normally containing water or other liquid, and the several receiving and discharge chambers of the series being arranged in alternation, as shown.

The pairs of receiving and discharge chambers C, C', D, D' and E, E' are respectively connected together at their lower ends by chambers $C^3$, $D^3$, and $E^3$, and the upper ends of the discharge and receiving chambers C', D, D', E, etc., of adjacent pairs of sections are connected with one another as by means of the pipes or chambers $c$, $d$, $e$, so that the successive chambers and connecting channels form a continuous channel from the inlet $a$ to the port $z$ of final discharge.

The pairs of chambers C, C', D, D' and E, E' are also placed in communication with one another at their upper ends as by means of the restricted air passages $m$, $n$ and $o$; and the lower end of each receiving chamber is placed in communication with the next following receiving chamber of the series as by means of the equalizing pipes $C^2$, $D^2$ and $E^2$, and the chambers $c$, $d$, $e$, etc., above referred to, as shown; the pipes $C^2$, $D^2$, $E^2$, etc., being preferably of smaller diameter than the connecting chambers $C^3$, $D^3$ and $E^3$. The pipe $C^2$ is connected to the receiving chamber C at the lower end thereof, but at a point substantially above its bottom, and extends to the upper part of the next adjoining discharge chamber C'. In like manner the equalizing pipe $D^2$ of relatively small diameter is connected from the lower part of the receiving chamber D to the upper part of the next following discharge chamber D', and in similar manner an equalizing pipe is connected from the lower part of each receiving chamber to the upper part of the next adjoining discharge chamber of the series for as many chambers as are used in the embodiment of my invention illustrated.

The operation of the device is as follows:

All of the chambers with connection and equalizing pipes are normally filled with water. If now the inlet of the device be connected to a pipe or vessel containing steam and some water, in a manner such that the water will pass into the device either by gravity or by reason of the pressure of the superimposed steam, the water so entering will displace and cause a movement or flow of the water through the chambers and connecting pipes and will cause a discharge from the outlet of the device of an amount of water equal to that delivered into the device through the inlet, and with a continuous inflow of water through the inlet will discharge a continuous flow of equal amount at the outlet.

Further, as soon as the water has been drained away from the pipe or vessel to which the device is connected, the superimposed steam will follow, and if at a pressure above atmospheric, will continue to enter chamber C and continue to displace the water in said chamber, lowering the level of the water in said chamber.

Assume now that the pressure of the steam is five pounds per square inch above atmospheric pressure; and that the difference in level from the point where the equalizing pipe $C^2$ is connected to the chamber C, and the point where the water is discharged from the device is about 27″, then, bearing in mind that a column of water 27″ in height exerts a static pressure of one pound per square inch at the bottom of the column, the five pounds pressure of steam, will readily displace the water in the chamber C and lower the level of the water in said chamber until the lower end of the equalizing pipe $C^2$ is exposed, even though it is forced to support a column of water 27″ in height equal to a resistance of one pound per square inch. As soon as the lower end of equalizing pipe $C^2$ is exposed, the steam quickly rises through the equalizing pipe and commences to displace the water in chamber D, the level of which now begins to fall in chamber D.

It is to be noted, however, that while the pressure of steam in the chamber C is five pounds per square inch, the pressure in chamber D can never exceed four pounds per square inch, as the pressure in chamber C must support or balance the pressure in chamber D plus the pressure due to the height of water column of about 27″, which is equivalent to one pound.

Now, with a pressure of steam of four pounds in the upper part of chamber D, the level of the water is lowered, steam from chamber C passing through the equalizing pipe $C^2$ to chamber D to maintain a pressure therein of four pounds. In like fashion the water in chamber E is displaced, but the pressure of steam in said chamber is but three pounds, while in chamber F it is two pounds and in chamber G one pound, and which pressure is now insufficient to quite uncover the lower end of equalizing pipe $G^2$ and no steam exists in chamber H, and in the succeeding chambers.

As long as the pressure of steam in chamber C remains at five pounds per square inch, the conditions in the various chambers will remain as described. Any condensation of steam in the chambers C, D and E, etc., will be replaced by steam from the pipe to which the trap is connected and will be delivered through the small equalizing pipes $C^2$, $D^2$, $E^2$, etc.

When a quantity of water or a steady small flow of water is received by the trap through the inlet passage or conduit $a$, as the water falls to the bottom of the chamber C any steam mixed therewith becomes free therefrom, and mixes with the steam in chamber C. As the water accumulates in chamber C the weight thereof, together with the pressure of steam, causes a displacement of an equal amount of water into the chamber C′ by way of connecting pipe $C^3$, and in like manner equal quantities of water are displaced in each succeeding chamber and finally from the outlet or discharge conduit or passage $z$ of the trap.

Again, the quantity of water entering the trap may be so great as to fill completely the inlet $a$ with a steady stream of water passing through inlet $a$ and into the trap at considerable velocity.

The device, however, continues to operate as before described, having passages as large or larger than the pipe to which it is connected, allows a rapid displacement of water from chamber to chamber and final discharge from the trap without disturbing the conditions of balance within the device.

It is to be noted that with a proper height of chambers such that the column of water to be supported in each unit is about 27″, then the reduction of steam pressure through the device is about one pound for each chamber or unit used, and which number, of course, may be increased or decreased at will. In like fashion the height of chambers may be made such that the column of water to be supported in each unit is much greater than 27″, and the reduction in steam pressure by each unit will be correspondingly greater than one pound. The number of units to be employed would be such that the total height in inches of all the available water columns in the various chambers when divided by 27″ will give a quantity that will be greater than any pressure of steam that is liable to exist at any time in the pipe or vessel to which the trap is connected.

Considering now the condition where the pressure of steam at the inlet $a$ is initially five pounds per square inch, while in each succeeding chamber D, E, F, etc., the pressure is lower by one pound for each unit and where such initial pressure at inlet $a$ is slowly reduced to one pound pressure per square inch. In such case the various alternate columns of water and steam in the various chambers and connecting pipes readjust themselves to maintain a total unbalanced water column equal only to the one pound of pressure in the first chamber C. Any condensation of steam now no longer being replaced with steam through the equalizing pipes, produces a vacuum in the upper part of the various chambers which is immediately filled by water backing in from the discharge.

A practical construction of my invention for commercial use is shown in Figs. 2 to 8 inclusive, and it is only necessary to definitely describe one of the plurality of hollow members or sections therein illustrated, as all of the remaining sections are duplicates of the one described; with the exception only of the fact that the two end sections are provided with supporting legs while the intermediate sections are without supporting legs; all the members or sections being secured together in a single group by ties or brace rods hereinafter described.

Referring to these figures, 9 represents a hollow metallic closed structure preferably of cast metal provided with side walls 10 and 11, end walls 12 and 13, a top 14 and a bottom 15. Projecting from the bottom of each of the end sections as shown in Figs. 2 and 3, are supporting legs 16 and 17 respectively. These sections are provided respectively with an entrance port $a$ and an exit port $c$ near the top thereof.

Extending downwardly from the top wall of the section is a plate 20 extending the entire width of the device and formed integrally with the sides. The lower extremity of this plate is beveled at 21 and near the top thereof is a horizontal bridge 22 provided with a leakage orifice 30. Into this orifice is screwed or fitted by other suitable means, a hollow metal member 31 provided with a cavity 33 and in the side of which near its covered end is a small leakage hole 32 built to permit the passage of air which may be confined at the top as hereinafter described. Directly above this device, I provide a hole 35 which is stopped by a screw plug 36 which is so arranged that when the plug is taken out, the metal member 31 may be unscrewed by the insertion of a suitable tool so shaped as to fit the head thereof.

Upon the side of the end members near the bottom is a small opening 37 fitted with a screw plug 38 for the purpose of affording a means to clean the device of sediment which may be collected at the bottom. At the bottom of the intermediate members, I provide a hole 37' fitted with a screw plug 38' for the purpose of affording an entrance to the bottom of the chamber to clean the same. Extending from side to side of the chamber is a partition 40, the upper portion of which extends from a point a short distance below the horizontal bridge or partition and extending substantially parallel with the plate 20 down to a point midway to the end 21 of the plate 20 and the bottom of the cavity, and the end of said partition 40 is cut substantially horizontal. The sections are fitted together at their respective entrance and exit ports $a$ and $c$ by a thimble 42, and at the bottom there is provided a tie rod 44 extending through the lugs at the bottoms of the several sections, as shown in Fig. 2. This tie rod is provided with nuts 45 and 46 at either end to hold the sections together. Small lugs 47 and 48 project from the sides of the sections in order to space the sections apart at a suitable distance.

The sections are thus connected together in a manner similar to the sections of an ordinary steam radiator, and in outward appearance they have the usual form of such a device.

Applying the chambers and passage-ways of the hollow member or section just described to the conventionally shown chambers and passage-ways of Fig. 1, it is seen that the left hand chamber in Fig. 3 is a receiving chamber corresponding with the chambers C, D, etc., while the right hand chamber is a discharge chamber corresponding with the chambers C', D' etc. The fact that the partition 40 and plate 20 terminate above the lower end of the hollow member provide chambers corresponding with the chambers $C^3$, $D^3$, etc., whereby the lower end of the receiving chamber of each pair of chambers thus provided for is connected with the discharge chamber of the pair: while the fact that the partition 40 and plate 20 are spaced apart from one another provides a passage corresponding with the conduits $C^2$, $D^2$, etc., whereby the lower end of the receiving chamber of each section is connected with the upper end of the discharge chamber of the section, and is placed in communication with the next following receiving chamber of the series through the passage C.

The operation of the device when the pressure of the steam or other superimposed vapor is reduced below that which had previously existed, is as follows:

Assuming a pressure of ten pounds at the inlet of the device then, as above, the pressure in chamber C will be ten pounds, in chamber D nine pounds, chamber E eight pounds, etc. If now the pressure in chamber C and in the pipe to which the trap is connected is reduced to atmospheric pressure or slightly above, then the columns of water supported by the pressure in the connecting channels $C^3$, $D^3$, $E^3$, etc., and in the equalizing channels $C^2$, $D^2$, $E^2$, etc., will immediately fall and the level of the water in the chambers C, D and E will immediately rise until the level of the water in the various chambers of the trap is the same. If now steam had existed above the water in each chamber, then the condensation of the steam due to radiation, would cause vacuums to form and the atmospheric pressure at the inlet and discharge of the trap will cause the spaces to be filled with water as previously referred to.

It is to be noted, however, that considerable quantities of air may be mixed with the steam entering the device, as often occurs in the return pipes of steam heating systems, and as air is considerably heavier than steam at the same temperature and pressure, then in the initial case above where a pressure of ten pounds exists in chamber C, the lower part of this chamber will be filled with air due to its greater specific gravity, and furthermore the chamber D would be partly filled with air due to the displacement of water by the escape of the contents of chamber C through the equalizing pipe $C^2$. As noted, air may occupy the lower portion of chamber C and therefore we would expect to find that air had passed to chamber D. In the case, therefore, where the water in the various chambers has returned to the same level due to reduction of the initial pressure in chamber C from say ten pounds to atmospheric pressure instead of the steam only appearing in the upper part of each chamber, there will be a mixture of steam and air and after the condensation of the steam occurs there will still remain a pocket of air in each of the chambers. If now the water continues to enter the trap it will be prevented from passing from chamber to chamber on account of the pressure of the superimposed air in each chamber, for which there is no escape provided. This would cause an air binding of the trap and interfere with its proper operation.

By reference to Figs. 3, 4 and 5, a small leakage orifice is noted at 30 consisting of a hollow metal member 31 screwed or tapped into the partition separating the upper part of the chamber G from the chamber C', and through the side of which a small leakage hole 32 is drilled which will permit the confined air in the top of the chamber C to pass into the chamber C' and then into chamber D, and through a similar orifice in the chamber D', etc., so that with the entry of water into the chamber C, any superimposed air is forced through the various leakage orifices 32 and finally finds its way into the discharge from the trap and is entirely displaced by the entering water.

If the device is operated at atmospheric pressure or at a pressure at the inlet equal to that at the discharge then it will be filled with water throughout all of its chambers and the water will be flowing through the channels designed therefor, and at the same time will be flowing through the leakage orifices 32. If steam be present in the upper part of each chamber there will be a slight leakage of steam from one chamber to the next adjoining entirely through the device from inlet toward the discharge, but as the orifice is very small and as the volume of a pound of steam is very large, and as the radiation of heat from the upper part of the chambers is such as to condense steam rapidly, then the rate of flow of a given amount of steam through the leakage holes will be less than the rate of condensation of such steam in the upper parts of the chambers, and any steam which tends to leak through such orifice with only a pound difference of pressure on the two sides of each orifice, would be condensed into water before it had progressed more than through a few of the leakage orifices.

By means of the leakage orifice I get rid of the air which would otherwise be pocketed and prevent the proper operation of the device, and yet by using a very small orifice, the passage of a sufficient quantity of steam such as to eventually reach the discharge of the trap without being condensed is prevented.

It is to be understood that I do not limit myself to the particular shape or form of any part shown, neither do I limit myself to the precise arrangement of the parts with respect to each other.

It is to be further understood that the above description and drawings are merely illustrative, and that the invention is not to be limited in any respect, except as defined in the subjoined claims.

1. In a device of the class described, a series of vertically extending receiving and discharge chambers arranged in alternation; a supply conduit leading into the first of said receiving chambers; a discharge conduit leading from the last of said discharge chambers; means whereby the lower end of each receiving chamber is placed in communication with the lower end of the next following discharge chamber of the series; means whereby the upper end of each discharge chamber is placed in communication with the upper end of the next following receiving chamber of the series; and means whereby the lower end of each receiving chamber is placed in communication with the upper end of the next following receiving chamber of the series.

2. In a device of the class described, a series of vertically extending receiving and discharge chambers arranged in alternation; a supply conduit leading into the first of said receiving chambers; a discharge conduit leading from the last of said discharge chambers; means whereby the lower end of each receiving chamber is placed in communication with the lower end of the next following discharge chamber of the series; means whereby the upper end of each discharge chamber is placed in communication with the upper end of the next following receiving chamber of the series; and a conduit extending between the lower end of each receiving chamber and the upper end of the next following discharge chamber of the series.

3. In a device of the class described, a series of vertically extending receiving and discharge chambers arranged in alternation; a supply conduit leading into the first of said receiving chambers; a discharge conduit leading from the last of said discharge chambers; means whereby the lower end of each receiving chamber is placed in communication with the lower end of the next following discharge chamber of the series; means whereby the upper end of each discharge chamber is placed in communication with the upper end of the next following receiving chamber of the series; means whereby the lower end of each receiving chamber is placed in communication with the upper end of the next following receiving chamber of the series; and means whereby a restricted passage is provided between the upper ends of the first and last of the chambers of the series.

4. In a device of the class described, a series of vertically extending receiving and discharge chambers arranged in alternation; a supply conduit leading into the first of said receiving chambers; a discharge conduit leading from the last of said discharge chambers; means whereby the lower end of each receiving chamber is placed in communication with the lower end of the next following discharge chamber of the series; means whereby the upper end of each discharge chamber is placed in communication with the upper end of the next following receiving chamber of the series; a conduit extending between the lower end of each receiving chamber and the upper end of the next following discharge chamber of the series; and a restricted passage whereby the upper end of each receiving chamber and the upper end of the next following discharge chamber of the series are placed in communication with one another.

5. In a device of the class described, a plurality of vertically extending pairs of chambers and each of which pairs comprises a receiving and a discharge chamber in communication with one another at their lower ends; an inlet passage leading into the upper end of the receiving chamber of the first pair of chambers; an outlet passage leading from the upper end of the discharge chamber of the last pair of chambers; means whereby the upper end of the discharge chamber of each pair of chambers is placed in communication with the upper end of the receiving chamber of the next following pair of chambers; and means whereby a passage is provided between the lower end of the receiving chamber and the upper end of the discharge chamber of each pair of chambers.

6. In a device of the class described, a plurality of vertically extending pairs of chambers and each of which pairs comprises a receiving and a discharge chamber in communication with one another at their lower ends; an inlet passage leading into the upper end of the receiving chamber of the first pair of chambers; an outlet passage leading from the upper end of the discharge chamber of the last pair of chambers; means whereby the upper ends of the discharge chamber of each pair of chambers is placed in communication with the upper end of the receiving chamber of the next following pair of chambers; means whereby a passage is provided between the lower end of the receiving chamber and the upper end of the discharge chamber of each pair of chambers; and means whereby a restricted passage is provided between the upper ends of the receiving and discharge chambers of each pair of chambers.

7. A hollow member having an internal vertically arranged partition extending downward from the upper end and terminating above the lower end thereof, whereby a receiving and a discharge chamber in communication with one another at their lower ends are provided within said member; an inlet passage leading into the upper end of said receiving chamber; an outlet passage leading from the upper end of said discharge chamber; and means whereby a passage is provided extending between the lower end of said receiving chamber and the upper end of said discharge chamber.

8. A hollow member having an internal vertically arranged partition extending downward from the upper end and terminating above the lower end thereof, whereby a receiving and a discharge chamber in communication with one another at their lower ends are provided within said member; an inlet passage leading into the upper end of said receiving chamber; an outlet passage leading from the upper end of said discharge chamber; means whereby a restricted opening is provided between the upper ends of said chambers; and means whereby a passage is provided extending between the lower end of said receiving chamber and the upper end of said discharge chamber.

9. A hollow member having two internal partitions spaced apart from one another and separating the interior thereof into a receiving and a discharge chamber, but which partitions terminate above the lower end of said member so that said chambers are in communication with one another at their lower ends, the upper end of the space between said partitions being in communication with the upper end of the discharge chamber through a suitable passage; an inlet passage leading into the upper end of the receiving chamber; and an outlet passage leading from the upper end of said discharge chamber.

10. A hollow member having two internal partitions spaced apart from one another and separating the interior thereof into a receiving and a discharge chamber, but which partitions terminate above the lower end of said member so that said chambers are in communication with one another at their lower ends, the upper end of the space between said partitions being in communication with the upper end of the discharge chamber through a passage provided in one of said partitions; means whereby a restricted opening is provided between the upper ends of said chambers; an inlet passage leading into the upper end of the receiving chamber; and an outlet passage leading from the upper end of the discharge chamber.

11. A hollow member having two internal partitions spaced apart from one another and separating the interior thereof into a receiving and a discharge chamber, but which partitions terminate above the lower end of said member so that said chambers are in communication with one another at their lower ends, the partition next to the receiving chamber being the shorter and the upper end of the space between said partitions being in communication with the upper end of the discharge chamber through a suitable passage; an inlet passage leading into the upper end of the receiving chamber; and an outlet passage leading from the upper end of the discharge chamber.

12. A hollow member having two internal partitions spaced apart from one another and separating the interior thereof into a receiving and a discharge chamber, but which partitions terminate above the lower end of said member so that said chambers are in communication with one another at their lower ends, the partition next to the receiving chamber being the shorter and the upper end of the space between said partitions being in communication with the upper end of the discharge chamber through a passage provided in one of said partitions; means whereby a restricted opening is provided between the upper ends of said chambers; an inlet passage leading into the upper end of the receiving chamber; and an outlet passage leading from the upper end of the discharge chamber.

Signed at the borough of Manhattan, city county and State of New York, this 28th day of March, 1917.

FRANK E. PENDLETON.

In presence of—
   Isabel R. Richards,
   Zita M. Graham.

Copies of this patent may be obtained for five cents each, by addressing the "Commissioner of Patents, Washington, D. C."